United States Patent [19]
van den Branden et al.

[11] Patent Number: 6,011,868
[45] Date of Patent: Jan. 4, 2000

[54] BITSTREAM QUALITY ANALYZER

[75] Inventors: Christian J. van den Branden, Sunnyvale, Calif.; Chong T. Ong, Richmond, Canada; Samson J. Liu, Menlo Park, Calif.; Mark A. Leonard, Richmond, Canada

[73] Assignee: Hewlett-Packard Company, Palo Alto, Calif.

[21] Appl. No.: 08/832,624

[22] Filed: Apr. 4, 1997

[51] Int. Cl.[7] ................................................ H04N 17/02
[52] U.S. Cl. .......................... 382/233; 382/235; 375/228
[58] Field of Search .................................. 382/235, 236, 382/233, 232, 246, 250; 348/403, 413, 416, 419, 423; 375/224–228

[56] References Cited

U.S. PATENT DOCUMENTS 5,774,497  6/1998  Block et al. ............................ 348/464
5,818,520  10/1998  Janko et al. ........................... 348/192

OTHER PUBLICATIONS

Huang et al., "An Interactive MPEG–1 Browsing System", IEEE Transactions on Consumer Electronics, vol. 42, No. 3, pp. 566–572, Aug. 1996.

Beakley et al., "Video Compression: The Need for Testing" SMPTE Advanced Television and Electronic Imaging Conference, pp. 742–750, Nov. 1995.

van den Branden Lambrecht, "Color Moving Pictures Quality Metric", IEEE, pp. 885–888, Sep. 1996.

Hewlett Packard "Test and Measurement News Online", Aug. 1995.

Interra MPROBE 110 product datasheet, May 5, 1997.

Wandel & Goltermann DTS–A product datasheet—date unknown.

*Primary Examiner*—Amelia Au
*Assistant Examiner*—Larry J. Prikockis

[57] ABSTRACT

A bitstream quality analysis system includes a demultiplexer, a bitstream quality analyzer, and a graphical user interface. The demultiplexer receives a bitstream and separates from the bitstream at least one elementary bitstream that includes a video elementary bitstream. The bitstream quality analyzer receives the video elementary bitstream from the demultiplexer and parses the video elementary bitstream to extract parameters characterizing the video elementary bitstream. The bitstream quality analyzer provides the extracted parameters to the graphical user interface, which displays the extracted parameters characterizing the video elementary bitstream. A user can monitor the video elementary bitstream at varying levels of detail, and can perform varying levels of quality analysis on the video elementary bitstream. Dependent on the level of monitoring an quality analysis selected by the user, the bitstream quality analyzer provides information relating to buffer usage and coding efficiency, and can predict the quality of the fully decoded video sequence without fully decoding the video elementary bitstream and without using the original video sequence.

19 Claims, 15 Drawing Sheets

FIG. 10
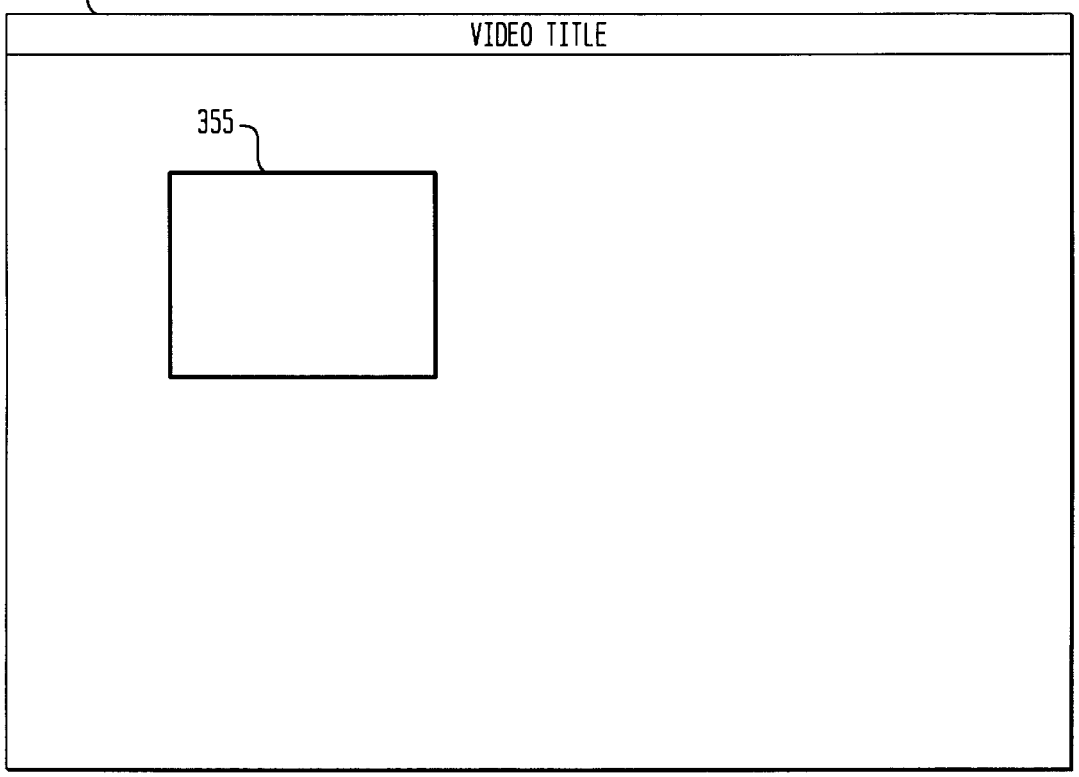
FIG. 11
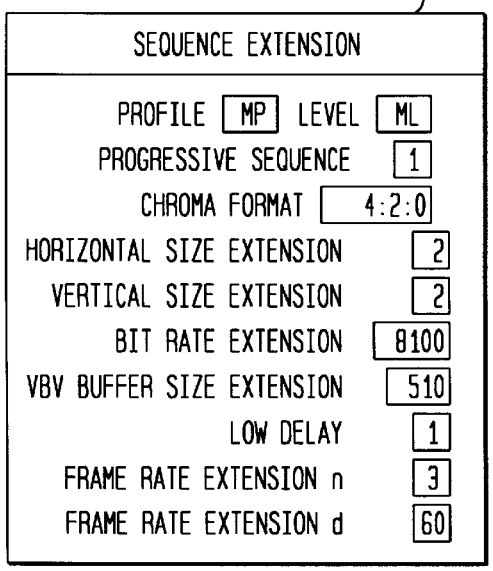
FIG. 12
| PICTURE CODING EXTENSION | |
|---|---|
| f_code[0][0] | 15 |
| f_code[0][1] | 15 |
| f_code[1][0] | 15 |
| f_code[1][1] | 15 |
| INTRA DC PRECISION | 8 |
| PICTURE STRUCTURE | TOP FIELD |
| TOP FIELD FIRST | 0 |
| FRAME PRED FRAME DCT | 1 |
| CONCEALMENT MOTION VECTORS | 0 |
| Q SCALE TYPE | 0 |
| INTRA VLC FORMAT | 0 |
| ALTERNATE SCAN | 0 |
| REPEAT FIRST FIELD | 1 |
| CHROMA 420 TYPE | 1 |
| PROGRESSIVE FRAME | 1 |
| COMPOSITE DISPLAY FLAG | 0 |

FIG. 16

ADDITIONAL MACROBLOCK INFORMATION

■ MACROBLOCK PATTERN [ 1 ]   ■ DCT TYPE   [ 0 ]

■ MOTION VERTICAL SELECT

|  | FORWARD | BACKWARD |
|---|---|---|
| TOP FIELD/FRAME |  |  |
| BOTTOM FIELD |  |  |

■ MOTION VECTORS

|  | FORWARD | BACKWARD |
|---|---|---|
| TOP FIELD/FRAME | (5,6) | (5,6) |
| BOTTOM FIELD |  |  |

■ DCT DC PRECISION [ 8 ]   ■ DUAL PRIME PREDICTION [ 0 ]

■ DCT COEFFICIENTS [ 4 ]   BLOCK

```
3.124567    3.124567    3.124567    3.124567
3.124567    3.124567    3.124567    3.124567
3.124567    3.124567    3.124567    3.124567
3.124567
3.124567
3.124567
3.124567
3.124567                             3.124567
```

FIG. 17 SPATIAL DISTORTION ESTIMATION ANALYSIS

BITSTREAM QUALITY ANALYZER

BACKGROUND OF THE INVENTION

1. Field of the Invention

The present invention is directed to methods and apparatus for monitoring and analyzing a video bitstream. More particularly, the present invention is directed to methods and apparatus for monitoring an MPEG video bitstream and providing metrics and analysis of the MPEG video bitstream at varying levels of detail based on the level of monitoring and analysis selected by a user. Levels of monitoring and analysis include monitoring the various characteristics and attributes of the MPEG video bitstream, testing for MPEG compliance and real-time decodability, and predicting the visual quality of decompressed video sequences contained in the MPEG video bitstream.

2. Discussion of the Related Art

The MPEG (Moving Picture Experts Group) standards are some of the most widely accepted digital video encoding standards and include MPEG-1 and MPEG-2 (MPEG-4 is still in development). MPEG-2 supports higher video quality at higher bit rates than MPEG-1, allows more options in encoding and decoding formats than MPEG-1, and is capable of handling existing MPEG-1 encoded bitstreams. MPEG-2 can also handle interlaced video and supports the scalable syntax, which allows an encoder to create enhancement layers that can both increase the quality and the spatial and temporal resolution of the motion picture. Such scalability is very useful in video applications involving telecommunications, video service with multiple qualities, video on ATM networks, and HDTV.

FIG. 1 illustrates a conventional MPEG (the term MPEG is used to denote MPEG-1 or MPEG-2, unless specifically noted otherwise) decoder 5. The decoder 5 includes a system decoder 10 that parses the MPEG bitstream and feeds separated audio and video bitstreams (containing compressed audio and video data), along with timing information, to an audio decoder 15 and a video decoder 20. The audio and video decoders 15, 20 then decode their respective audio and video bitstreams to provide output data.

As shown in FIG. 2, an MPEG video bitstream includes six layers: a video sequence layer, a group of pictures layer, a picture layer, a slice layer, a macroblock layer, and a block layer. In FIG. 2, those portions of the video sequence that are denoted parenthetically are optional. The upper level layers of an MPEG video bitstream differ, dependent upon whether the video sequence is an MPEG-1 video sequence or an MPEG-2 video sequence. Both MPEG-1 and MPEG-2 video sequences start with a sequence header and end in a sequence end code. The MPEG-1 sequence header is followed by at least one or more groups of pictures, each group of pictures starting with a group of pictures header and including at least one picture, with each picture starting with a picture header and including one or more slices. In contrast, the MPEG-2 sequence header is followed by sequence extension information, and therefore, an MPEG-2 video sequence is easily differentiated from an MPEG-1 video sequence. The sequence extension is followed by a GOP header (optional), one or more pictures and the sequence end code. As shown, the GOP header may be followed by user data (optional). Each picture includes a picture header, followed by picture coding extension information, extension and user data (optional) and at least one slice.

Regardless of whether the sequence is an MPEG-1 video sequence or an MPEG-2 video sequence, each slice is made up of one or more macroblocks. A macroblock is made up of several 8 by 8 Discrete Cosine Transform (DCT) coefficient blocks along with a number of other parameters, such as quantization scale code, motion vectors, etc. (See ISO/IEC Standard 13818-2). The number of blocks forming a macroblock can vary, dependent on whether the video sequence is MPEG-1 or MPEG-2. For MPEG-2, the number of blocks can also vary dependent on the chroma format. Each block contains quantized DCT coefficient values that are variable-length encoded. Further details concerning MPEG are widely available, including MPEG VIDEO COMPRESSION STANDARD, Joan L. Mitchell et al., Chapman & Hill, 1997, ISBN 0-412-08771-5, which is incorporated herein by reference.

A simplified functional diagram of a conventional video decoder 50 is illustrated in FIG. 3. Conventional video decoders are generally implemented as a 'black box' in which the video decoder 50 receives a video bitstream and provides output video data. Within the black box, the decoder 50 decodes the video bitstream on a macroblock-by-macroblock basis by performing the following operations. First, the video decoder performs Inverse Variable Length Coding (IVLC) to expand the variable-length encoded data. Then, the video decoder dequantizes the quantized DCT coefficients (termed Inverse Quantization of DCT coefficients (IQDCT)) based on the appropriate quantization tables (matrices) and the quantization scale to reconstruct (as near as possible) DCT coefficients. Next, the video decoder performs Inverse DCT (IDCT) calculations and motion compensation to reconstruct the pixel data, which is provided as output video data at the appropriate time.

Because the MPEG standards have been so widely accepted and their use so varied, and because many different vendors make or sell MPEG products, there is a significant need to both monitor and analyze the quality of an MPEG bitstream to verify at least minimal conformance with the standards. Due to the greater bandwidth demands of the video bitstream versus the audio bitstream, this need is particularly acute with respect to the MPEG video bitstream. For example, designers of MPEG video encoders want to know that their output is MPEG compliant, while designers of MPEG video decoders want to know whether the data they are using to develop and test their design is, in fact, compliant with the standard. Furthermore, although the MPEG video syntax is specified in the standards, subtle differences in interpretation of the standards can exist while still conforming to the standard, and therefore interoperability problems are almost inevitable. Accordingly, designers of both encoders and decoders need a tool to analyze an MPEG video bitstream and isolate interoperability problems.

Beyond this level of monitoring and quality analysis, there is also a need to provide information and quality analysis relating to those parameters over which designers of MPEG encoders have some choice. These parameters may or may not be optimal, dependent on the particular encoding process used and the underlying video material that was encoded. Such information and quality analysis can provide feedback to help designers develop more efficient encoding algorithms that optimize picture quality for a given number of bits.

There is also a need to monitor and assess the quality of the resulting video output data as it is seen after it has been received and decoded by an MPEG video decoder. This information is useful to designers of MPEG encoders as well as to broadcasters of MPEG transmissions. For example, a broadcasting station could use the information to save bandwidth if the quality of the video output data was higher than necessary, and to increase the bandwidth of the transmitted signal if the quality of video output data was poor. Although conventional systems are available to assess the quality of video output data after encoding and decoding processes, these systems rely on a comparison of the decoded output video data to the original input video data. This sort of comparison is computationally expensive inasmuch as it requires the full decoding of the received video bitstream and a bit-by-bit comparison with the input data. The time required for such a bit-by-bit analysis can be prohibitive. In addition, from a decoding point of view, the original input video data may simply not be available to the recipient of the MPEG bitstream.

SUMMARY OF THE INVENTION

According to an illustrative embodiment of the invention, a bitstream quality analysis system includes a demultiplexer, a bitstream quality analyzer, and a graphical user interface. The demultiplexer receives a bitstream and separates the bitstream into at least one elementary bitstream that includes a video elementary bitstream. The bitstream quality analyzer receives the video elementary bitstream from the demultiplexer and parses the video elementary bitstream to extract parameters characterizing the video elementary bitstream. The bitstream quality analyzer provides the extracted parameters to the graphical user interface, which displays the extracted parameters characterizing the video elementary bitstream.

According to an aspect of the invention, the bitstream quality analyzer compares the extracted parameters to parameter values allowed by the MPEG (MPEG-1 and MPEG-2) standard and notifies the user, via the graphical user interface, when the video elementary bitstream does not conform to the standard. Even when the video elementary bitstream does not conform to the MPEG standard, the bitstream quality analyzer may extract parameters and provide them to the graphical user interface for display, depending on the amount of non-conformance.

According to another aspect of the invention, the bitstream quality analyzer includes an MPEG video decoder that receives the video elementary bitstream and selectively decodes the video elementary bitstream according to the level of monitoring and quality analysis selected by the user via the graphical user interface. Thus, if the user desires to view information pertaining to the various headers (sequence header, GOP header, etc), decoding is not performed at all and the bitstream quality analyzer simply parses information from the various headers to provide to the graphical user interface for display. If the user desires to view quantized DCT coefficient values, then decoding is performed through the IVLC level, and if the user desires to view the DCT values themselves, then decoding is performed through the IQDCT level. If the user desires to view the actual data, then full decoding is performed. Because the decoder selectively decodes the video elementary bitstream to the level required by the user, considerable time and computational resources are saved.

According to a further aspect of the invention, the bitstream quality analyzer analyzes information provided by the video decoder and calculates various metrics allowing the user to determine the quality of the encoding process. Based on decoded parameters obtained from decoding the elementary video bitstream to the IVLC level, the bitstream quality analyzer calculates metrics pertaining to the amount of compressed data in the video decoder, how well the encoder estimated the size of the decoder buffer, how well the encoder estimated the bit rate, and whether coded bits are being used efficiently.

According to another aspect of the invention, the bitstream quality analyzer further includes a compressed domain quality meter that predicts the quality of the fully decoded video sequence contained within the video elementary bitstream without fully decoding the video elementary bitstream and without using the original video sequence. The methods used to predict the quality of the fully decoded video sequence may be used on any video sequence that has been compressed according to a block DCT compression scheme, including MPEG-1 and MPFG-2, H.261, and H.263.

Based on parameters obtained from decoding the elementary video bitstream to the IVLC level, the compressed domain quality meter predicts the amount of spatial distortion in the fully decoded video sequence due to quantization of the DCT coefficients. Based on this same level of decoding, the compressed domain quality meter also predicts the amount of spatial distortion in the fully decoded video sequence that is capable of being perceived by a human observer. The compressed domain quality meter also predicts a third metric of the quality of the fully decoded video sequence that is indicative of the amount of motion prediction error in the encoding process. Although the third metric requires the inverse quantization of DCT coefficients, this step is performed only on the non-intra blocks, and does not require full decoding of the video elementary bitstream, nor does it require the original video sequence.

BRIEF DESCRIPTION OF THE DRAWINGS

Illustrative embodiments of the present invention are described by way of example with reference to the accompanying drawings, in which:

FIGS. 10–20 illustrate various views, as seen by a user, of a graphical user interface of a video bitstream analysis system according to an embodiment of the present invention.

DETAILED DESCRIPTION

Figure 4:
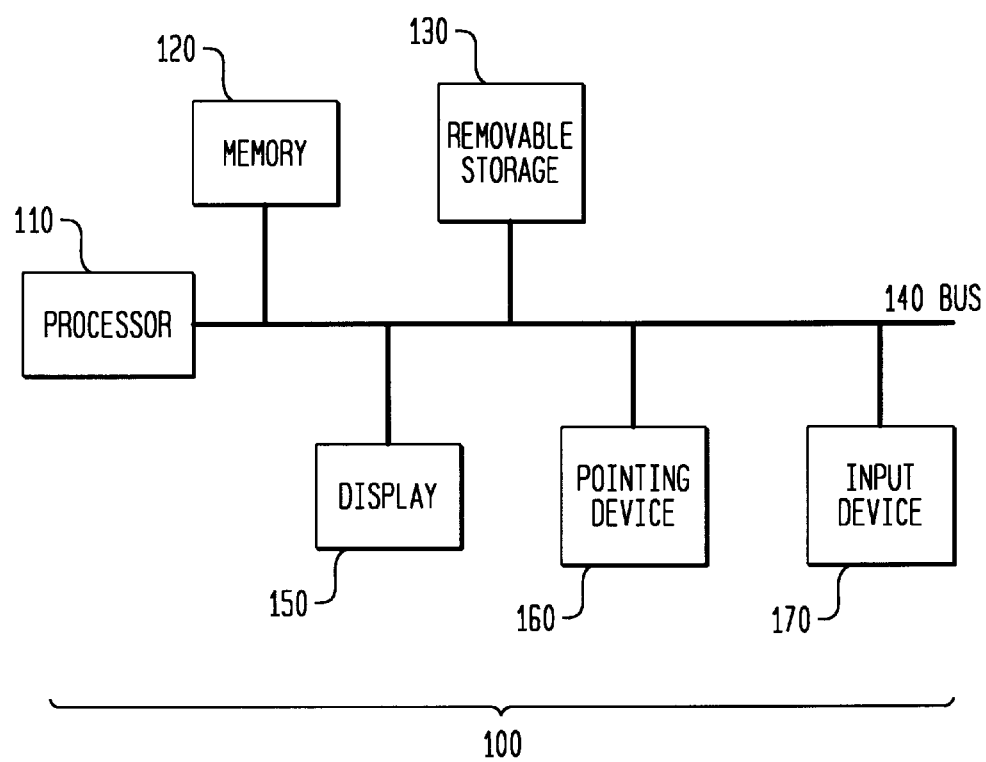
FIG. 4 illustrates an example of a personal computer on which embodiments of the present invention can be implemented.

According to a first aspect of the present invention, a bitstream quality analyzer is implemented in software on a personal computer (PC) running the Windows NT™ operating system. An illustrative PC 100 in which the present invention can be implemented is shown in FIG. 4. The PC 100 includes a processor 110, a memory 120, a removable storage device 130, a display 150, a pointing device 160, and an input device 170, all coupled together via a bus 140. It should be understood that this PC 100 is shown merely for illustrative purposes, and that the present invention is not limited to use with a system having this specific configuration, as other configurations are possible. For example, the memory 120 may consist of memory devices such as hard disk drives or optical disk drives, RAM, ROM, or other memory devices and combinations thereof. The input device 170 may include a keyboard that allows a user to interact with the system. The pointing device 160 may, for example, be a puck, joystick, trackball, or mouse. The display 150 may be a CRT screen, or similar device, that allows the user to monitor MPEG parameters and visualize his/her interactions with the bitstream quality analyzer. The removable storage device 130 may be a CD-ROM drive, a tape drive, or a diskette drive. The removable storage device 130 can be used to load application software including the bitstream quality analyzer software.

Software, including code that implements the present invention, may be stored on some type of removable storage media such as a CD-ROM, tape, or diskette. The software can be copied to a permanent form of storage media on the PC (e.g., a hard disk) to preserve the removable storage media for back-up purposes. When the bitstream quality analyzer software of the invention is actually in use, the software is generally and at least partially stored in RAM, and is executed on the processor 110.

Figure 5:
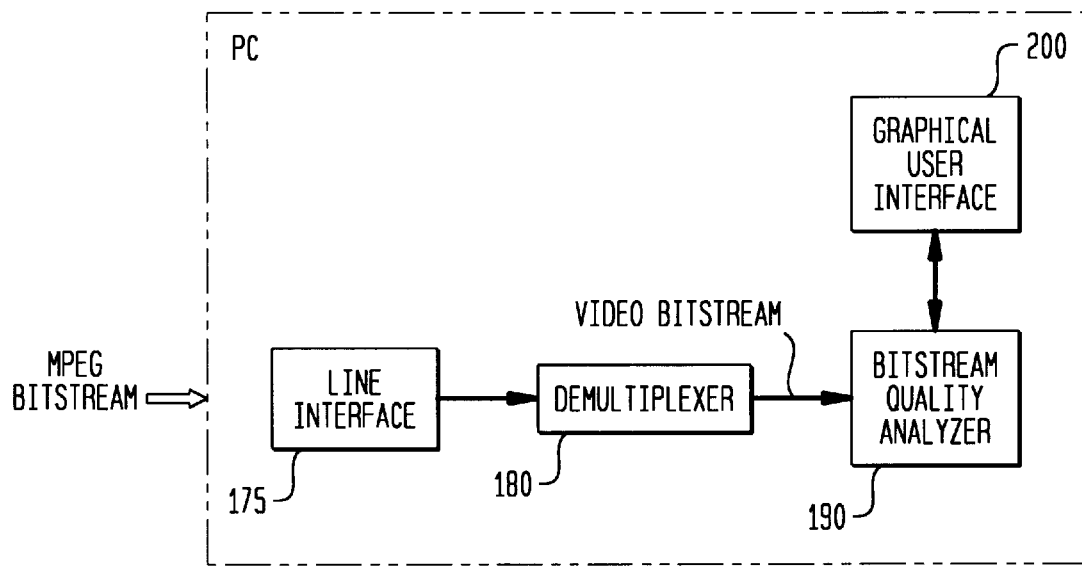
FIG. 5 illustrates a high level functional block diagram of an MPEG video bitstream analysis system according to an embodiment of the present invention.

FIG. 5 depicts a high level functional block diagram of an MPEG video bitstream analysis system according to an embodiment of the present invention. The MPEG video bitstream analysis system includes a line interface 175, a demultiplexer 180, a bitstream quality analyzer 190, and a graphical user interface 200. The line interface 175 receives an MPEG bitstream and converts the MPEG bitstream into a format suitable for processing by the demultiplexer 180. The demultiplexer 180 separates the MPEG bitstream into various elementary bitstreams (audio, video, and/or multiple audio or multiple video elementary bitstreams) and provides the video elementary bitstream that is to be monitored to the bitstream quality analyzer 190. The bitstream quality analyzer 190 parses and decodes the video elementary bitstream to extract various parameters and perform varying levels of quality analysis on that bitstream. Information concerning the monitored MPEG video elementary bitstream, as well as varying levels of quality analysis, are displayed to a user via a Graphical User Interface (GUI) 200. In addition, through the GUI 200, the user is able to select the level of monitoring and quality analysis to control the bitstream quality analyzer 190.

In current embodiments of the present invention, the line interface 175 can be any one of a synchronous parallel interface (SPI) card, a synchronous serial interface (SSI) card, an asynchronous serial interface (ASI) card, or a G.703 interface card that is operatively connected to the PC's microprocessor bus. Because the actual implementation of the line interface 175 is dependent on the transmission medium on which the MPEG bitstream is received, and because the implementation of such a line interface 175 is known in the art, further description is omitted herein. Similarly, the actual demultiplexer 180 is implemented in software, and is based on the MPEG System Target Decoder (STD) which is well documented in the MPEG standard. Therefore, further description of the demultiplexer 180 is omitted herein.

The functional block diagram depicted in FIG. 5 suggests that the bitstream quality analyzer 190 is capable of keeping up with the video bitstream and operating in real time. Depending on the level of monitoring and the level of quality analysis desired, real time operation can be performed. Furthermore, various levels of monitoring and quality analysis can be performed in real time, depending on the resolution of the input video data, the input bit rate, etc.

Figure 6:
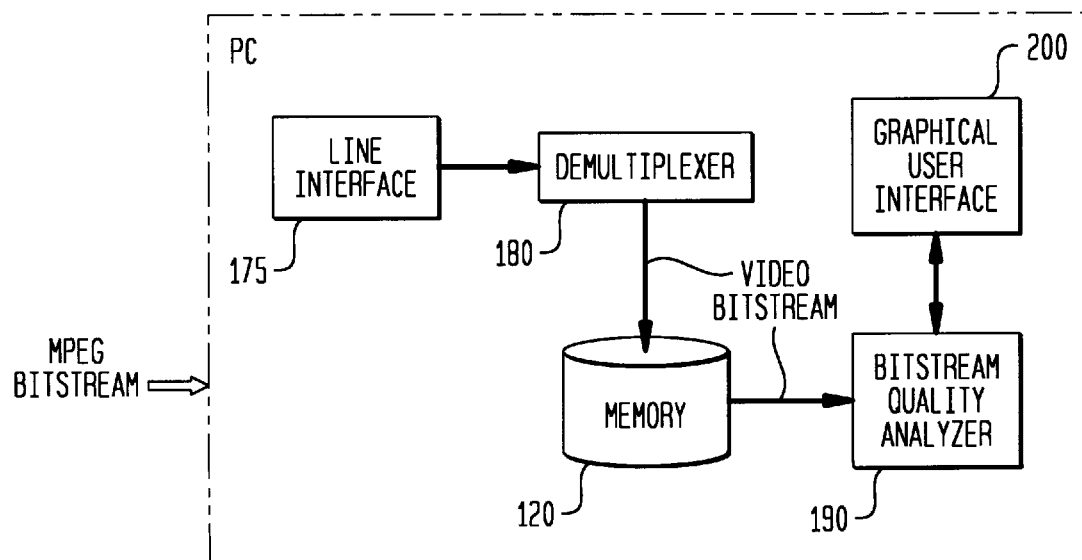
FIG. 6 illustrates a high level functional block diagram of an MPEG video bitstream analysis system according to another embodiment of the present invention.

FIG. 6 depicts a high level functional block diagram of an MPEG video bitstream analysis system according to another embodiment of the present invention that is similar to the embodiment of FIG. 5, but which does not need to operate in real time. The MPEG video bitstream analysis system of FIG. 6 includes a line interface 175, a demultiplexer 180, a memory 120, a bitstream quality analyzer 190, and a Graphical User Interface (GUI) 200. As in FIG. 5, the line interface 175 converts the MPEG bitstream into a format suitable for processing by the demultiplexer 180. The demultiplexer 180 separates the MPEG bitstream into various elementary bitstreams (audio, video, and/or multiple audio or multiple video elementary bitstreams) and writes the video elementary bitstream that is to be monitored to the memory 120. Accordingly, the bitstream quality analyzer 190 can access the video elementary bitstream from memory, parse and decode the bitstream to extract various parameters, and perform varying levels of quality analysis of the video elementary bitstream to any level of detail desired by the user, as real time operation is not required. Various information concerning the monitored MPEG video elementary bitstream and various levels of quality analysis are displayed to a user via the GUI 200. In addition, through the GUI 200, the user may select the level of monitoring and quality analysis to control the bitstream quality analyzer 190. For the same reasons mentioned with respect to FIG. 5, further description of the line interface 175 and the demultiplexer 180 is omitted. As can be appreciated, the memory 120 may be RAM, disk, or other type of writeable storage.

Figure 1:
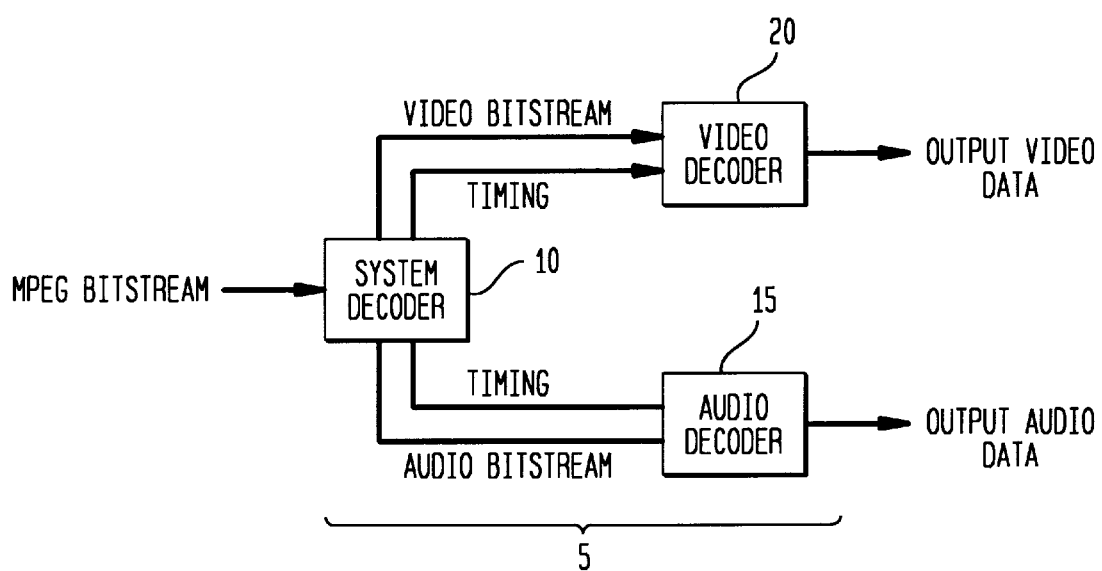
FIG. 1 illustrates a conventional MPEG decoder.
Figure 2:
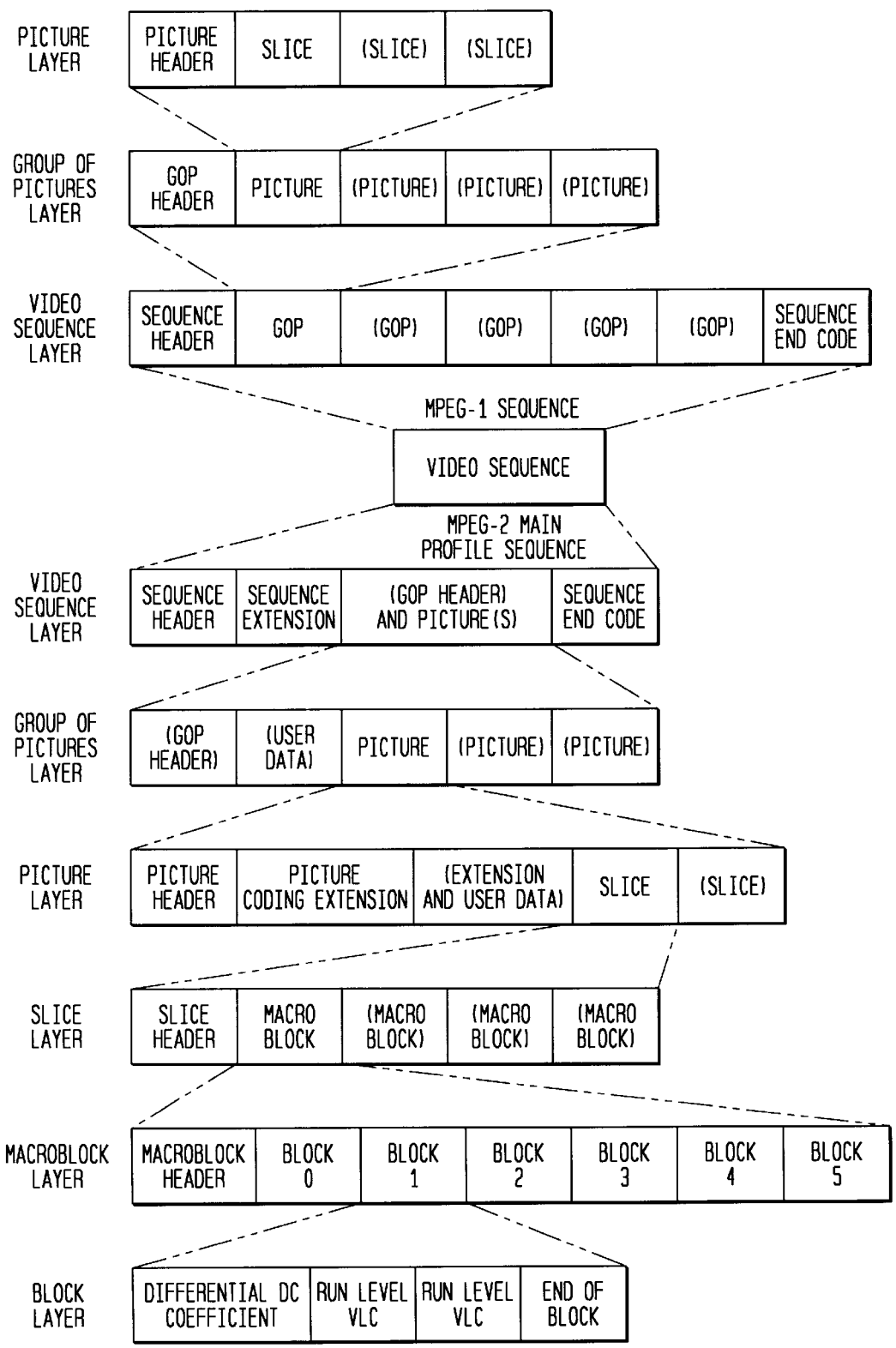
FIG. 2 illustrates various layers of an MPEG video sequence.
Figure 3:
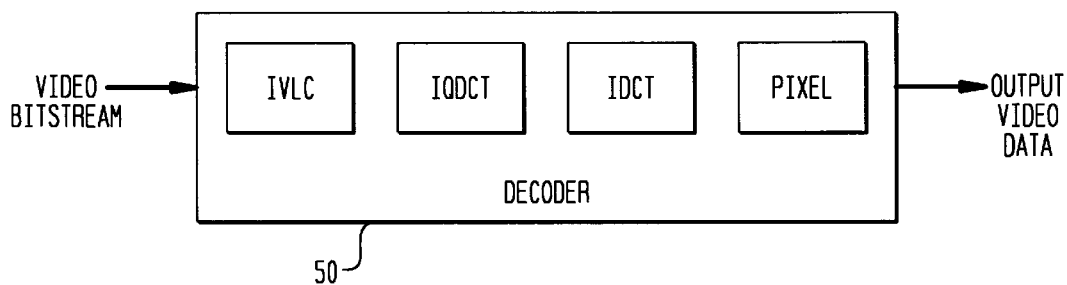
FIG. 3 illustrates a simplified functional diagram of a conventional MPEG video decoder.
Figure 7:
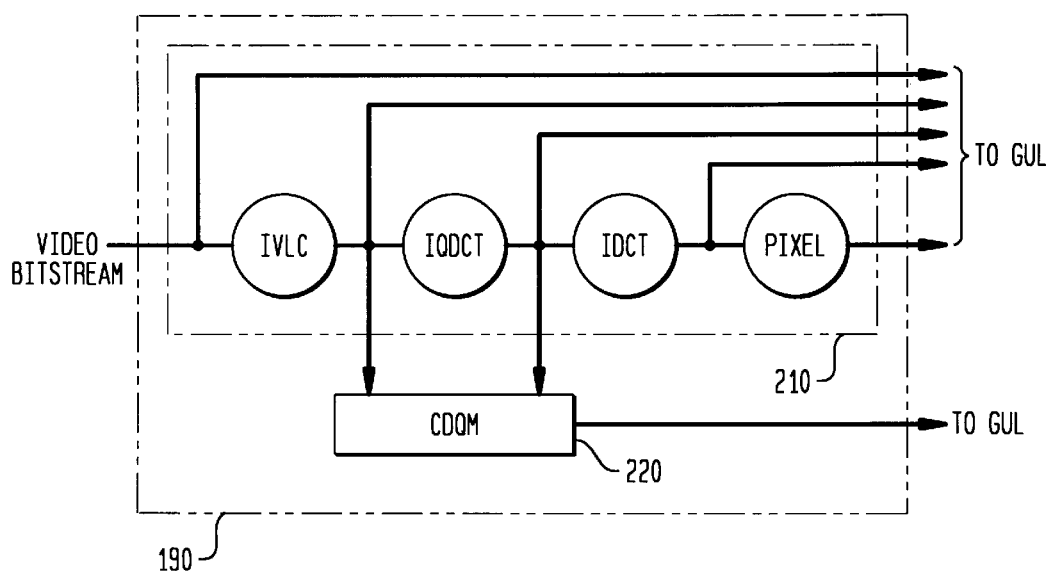
FIG. 7 illustrates a functional block diagram of a bitstream quality analyzer according to an embodiment of the present invention.

In broad functional overview, the bitstream quality analyzer 190 of FIGS. 5 and 6 is a device that monitors a video transmission and analyzes the quality of that video transmission at varying levels of detail, selectable by a user via the GUI 200. As shown in FIG. 7, the bitstream quality analyzer 190 includes an MPEG video decoder 210 and a Compressed Domain Quality Meter (CDQM) 220. The decoder 210 implements all of the functions of a conventional video decoder, including performing inverse variable length coding (IVLC) to expand the variable-length encoded data, performing inverse quantization of the quantized DCT coefficients (IQDCT) to obtain the DCT coefficients, and performing inverse DCT calculations (IDCT) and motion compensation to reconstruct the pixel data. However, in contrast to conventional video decoders that receive a compressed video bitstream and output pixel data, the decoder 210 of the bitstream quality analyzer 190 is capable of performing various levels of decoding, based on the level of monitoring and quality analysis selected by the user via the GUI 200. Within the bitstream quality analyzer 190, the CDQM 220 estimates various measures of distortion of the resulting video output (i.e. as pixel output) using only the compressed video bitstream.

As functionally depicted in FIG. 7, decoding of the video bitstream is performed within the decoder 210 of the bitstream quality analyzer 190 in layers, dependent on the level of monitoring and quality analysis selected by the user via the GUI 200. Accordingly, if the user desires to view information pertaining to the various headers (sequence header, GOP header, etc), decoding is not performed at all and the bitstream quality analyzer 190 simply parses information from the various headers to provide to the GUI 200. If the user desires to view quantized DCT coefficient values, then decoding is performed through the IVLC level, and if the user desires to view the DCT values themselves, then decoding is performed through the IQDCT level. If the user desires to view the actual data, then full decoding is performed. Because the bitstream quality analyzer 190 can instruct the decoder 210 to perform varying degrees of partial decoding, considerable time and computational resources may be saved, depending on the level of monitoring and quality analysis selected by the user via the GUI 200. Thus, real time operation for certain levels of monitoring and quality analysis are possible.

The bitstream quality analyzer 190 provides metrics and analysis for three classes of quality. At class 1, MPEG Syntax and Semantics, the bitstream quality analyzer 190 analyzes the video bitstream for conformance with the applicable MPEG (MPEG-1 or MPEG-2) standard and identifies whether the video bitstream meets the specifications of the applicable MPEG standard. At class 2, Dynamic Behavior, the bitstream quality analyzer 190 analyzes those parameters over which the designer of the encoder, or the broadcaster of the video bitstream had some choice, and displays information allowing one to assess the wisdom of those choices. At class 3, Video Quality, the bitstream quality analyzer 190 analyzes the quality of the resulting video output stream (i.e. pixel output) by providing estimates of various measures of distortion including mean square error, motion prediction error, and an objective metric that is based on human visual perception. Class 3 analysis is performed by the CDQM 220 within the bitstream quality analyzer 190.

At class 1, the bitstream quality analyzer 190 determines whether the video bitstream adheres to the applicable standard by analyzing header information, extension information, whether the appropriate end codes are present, etc., and comparing this information to the applicable standard. At class 1, the bitstream quality analyzer 190 examines both the syntax of the video bitstream and the semantics of the video bitstream for compliance with the applicable standard. For example, syntactical information that is examined may include whether the required information is extracted from the expected position in the video bitstream (e.g., are start codes extracted and recognized when they are supposed to be extracted, or is there a start code at an unexpected position in the video bitstream) according to the syntax rules prescribed by MPEG. Semantic information that is examined may include whether actual values of the various parameters are within minimum and maximum values established by the MPEG standard (e.g., the number of slices in a picture, whether values of dequantized DCT coefficients are within allowed values, etc.) and whether the rules of the standard have been followed (e.g., whether an I frame comes immediately after a GOP header, etc). Information regarding the applicable MPEG standards is stored in memory 120 of PC 100.

If the video bitstream conforms to an MPEG standard, then detailed information about the video bitstream is provided to the GUI 200 for display. For example, information that is provided to the GUI 200 for display may include whether the video bitstream is MPEG-1 or MPEG-2, actual parameter values within the various headers (sequence header, GOP header (if present), picture header, slice header, etc), extension information (sequence extension and picture coding extension (if MPEG-2)), as well as computationally based information such as the number of slices in a frame, etc. The level of detail of the information displayed to the user is selectable by the user via the GUI 200 and can require different levels of decoding, ranging from information that requires only parsing of the header information, to information that requires performance of inverse variable length coding (IVLC) and inverse quantization of the DCT coefficients (IQDCT).

The bitstream quality analyzer 190 is also able to monitor and analyze certain video bitstreams that are not compliant with MPEG standards. For example, MPEG encoders that were developed before a standard was frozen, and which may not be fully compliant can, if sufficiently well known, be recognized and the various parameter values displayed via the GUT 200. The extent of non-compliance may be semantic or syntactic, or both. In the embodiment of FIG. 6, even if the non-compliant video bitstream isn't recognized, there is no requirement for real-time decoding, and thus the bitstream quality analyzer can monitor non-compliant bitstreams that could not be decoded in real-time due to a variety of reasons. When the non-compliant video bitstream can be recognized or decoded, a dialog box is presented to the user for each incorrect parameter, with an informational message explaining the nature of the non-compliance. Moreover, all such errors are written to a log file for future reference and diagnosis. If the video bitstream is not compliant with MPEG standards, and it can not be recognized, then an informational message stating this fact is displayed by the GUI 200. In a current embodiment of the invention, a dialog box is presented to the user indicating that decoding of the video bitstream was not possible, and the most likely reason for non-compliance (e.g., an un-recognized start code at some point in the video bitstream). Of course, it should be realized that the bitstream quality analyzer 190 may be modified to monitor and analyze other types of bitstreams, like H.261 and H.263 bitstreams, each of which are structurally quite similar to MPEG and include video elementary bitstreams that are syntactically similar to those of MPEG.

At class 2, the bitstream quality analyzer 190 analyzes those parameters over which the designer of the encoder, or the broadcaster of the video bitstream had some choice, and provides information to the GUI 200 allowing one to assess the wisdom of those choices. For example, at class 2, the bitstream quality analyzer 190 provides the minimum size of the compressed video data buffer that the encoder believed sufficient to fully decode the video bitstream data (based on vbv_buffer_size and vbv_buffer_size_extension), and provides, on a frame-by-frame basis, various indicia of buffer fullness. Based on the STD model, the type of frame (I, P, or B), and the amount of compressed video data in the various types of frames, the bitstream quality analyzer 190 calculates the amount of compressed video data in the compressed video data buffer and updates this calculation each frame. The bitstream quality analyzer 190 also calculates a second metric of buffer fullness based on the amount of compressed video data in the compressed video data buffer and the amount of time the encoder believed a particular frame would be stored within the compressed video data buffer before that compressed data would be displayed and discarded (based on vbv_delay), and updates this calculation each frame. Although these two metrics should ideally yield the same result, in practice they do not, and hence, the bitstream quality analyzer 190 also calculates a difference between these two metrics and updates this difference calculation each frame. The different types of buffer information that is displayed via the GUI 200 readily allows one to identify if there is a risk of buffer underflow or overflow, and to determine how well the encoder estimated the minimum size required for the compressed video data buffer and how well the encoder estimated the amount of time that frames would remain in the compressed video data buffer. Furthermore, each one of these metrics of buffer fullness allow one to assess the real-time decodability of the video elementary bitstream.

In addition to providing various metrics relating to buffer status, the bitstream quality analyzer 190 provides information identifying the type of frame (I, P, or B), the amount of compressed video data in each type of frame, and the amount of bit stuffing (used by the encoder to achieve the target frame rate) in each type of frame. This information is provided to the GUI 200 on a frame-by-frame basis for each of the most recent frames, and allows the user to compare the amount of useful compressed video data in a particular frame to the amount of bit stuffing in that particular frame. Based on this information, the user can determine whether encoded bits are being used efficiently. This information also allows the user to get a rough indication of the expected resolution of the particular frame, as the resolution of the frame may be expected to be better when the amount of useful compressed data is high in relation to the amount of bit stuffing. The bitstream quality analyzer 190 also identifies the target bit rate set by the encoder and calculates a smoothed average value of the actual bit rate based on the amount of compressed video data received by the decoder 210 per unit time. This bit rate information identifies how well the encoder met the target bit rate. Accordingly, at class 2, the bitstream quality analyzer provides various metrics allowing the user to readily assess the quality of the video bitstream.

Figure 8:
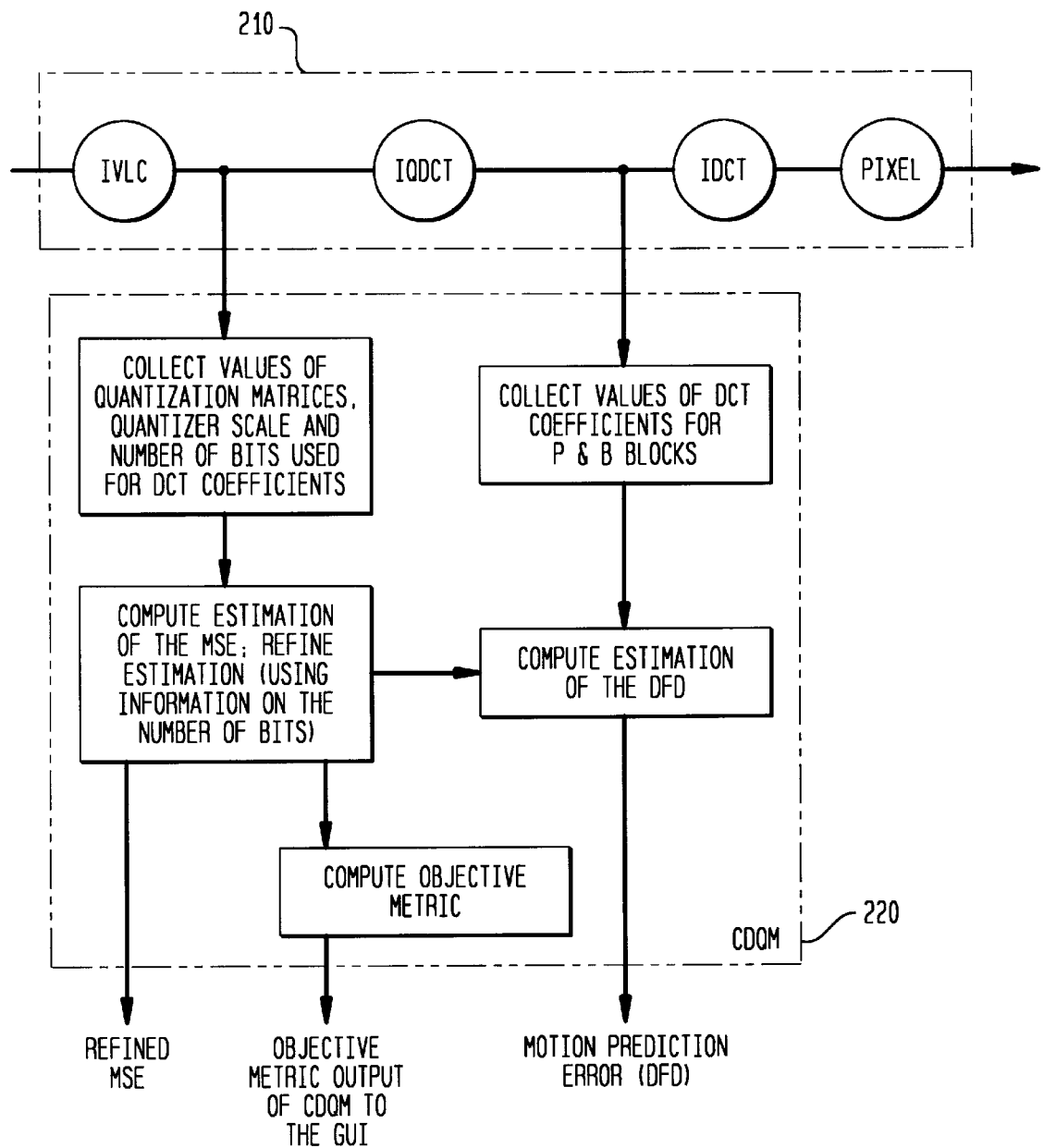
FIG. 8 illustrates a functional block diagram of a compressed domain quality meter according to an embodiment of the present invention.

At class 3, estimates of the quality of the resulting video output stream (i.e. pixel output) are provided using various measures of distortion, including mean square error, motion prediction error, and an objective metric based on human visual perception. The different estimates of the quality of the resulting video output stream are performed by the CDQM 220. These estimates require varying levels of decoding and are selectable by the user through the GUI 200. For example, as shown in FIG. 8, the estimation of the mean square error and the objective measure of distortion based on human visual perception require decoding of the video bitstream to only the IVLC level, while the estimation of the motion prediction error requires decoding to the DCT coefficient level (i.e. performing IVLC and IQDCT).

Regardless of which measure of quality is selected, none of the measures requires the full decoding of the video bitstream to the pixel level. Furthermore, none of the measures of quality requires the presence of the original input bitstream, prior to encoding, to judge quality, as the original input bitstream may be unavailable at the decoder. Accordingly, the analysis performed by the CDQM 220 may be performed either at a transmitting station or a receiving station, or both, to estimate the quality of the resulting output video bitstream in minimal time, with minimal processing, and without requiring the original input video bitstream prior to encoding. Thus, a broadcasting station may use the information to save bandwidth if the quality of the video output data is higher than necessary, and to increase the bandwidth of the transmitted signal if the quality of video output data is poor.

The CDQM 220 provides three different estimations predicting the amount of distortion in the resulting video output bitstream due to the encoding process. The first estimation predicts the amount of spatial distortion of the resulting video output stream due to quantization error, and is based on a mean square error analysis. The quantization error for a single DCT coefficient (in the DCT domain) is given by Eq. (1):

$$Q_{error} = |DCT_i - IQDCT_i| \qquad (1)$$

where $DCT_i$ is the original value of the "i"th coefficient before quantization and $IQDCT_i$ is the value of the "i"th coefficient after inverse quantization. However, this exact error analysis is of little use if the original coefficient value before quantization ($DCT_i$) is not available. Thus, the quantization error for a single DCT coefficient ($DCT_i$) of a coded block e of a macroblock (in the DCT domain) is instead approximated as shown in Eq. (2):

$$Q_{error} \approx \frac{1}{2}\Delta_i \qquad (2)$$

where $\Delta_i$ is the quantization step (the number by which the DCT coefficient, $DCT_i$, was quantized) for the "i"th coefficient, and $\Delta_i = M^* Q_i$, where M is the current quantization scale factor and $Q_i$ is the quantization value (from the quantization matrix) of the "i"th coefficient. Thus, in the pixel domain, the Mean Square Error (MSE) of a single coded block e of a macroblock is given by Eq. (3):

$$e = N \sum_{i=1}^{64} IDCT\left(\frac{1}{2}MQ_i\right)^2 = N\frac{M^2}{4} \sum_{i=1}^{64} IDCT(Q_i)^2 \qquad (3)$$

where N represents the number of blocks actually coded for that macroblock. The MSE is computed separately for luminance (Y) and chrominance ($C_r$, $C_b$) components. The value of N may change when one computes the MSE for the luminance signal versus the chrominance signal, and may also change depending on whether all the blocks of a given macroblock are coded. Thus, N represents the number of blocks that are actually coded in a given macroblock. The quantity $\Sigma IDCT(Q_i)^2$ from i=1 to 64 can be computed once for each of the quantization matrices (intra and non-intra). Furthermore, because the quantization matrices can change no more frequently than once each frame, this computation does not need to be performed very frequently.

Although the previously described estimation provides a useful prediction of the spatial distortion of resulting video output stream due to quantization error, further improvement is possible. Rate-distortion theory provides that the distortion is inversely related to the bit rate; that is, the more bits per unit time used in representing the compressed video data, the less the distortion, and vice versa. Analogously, the more bits used in coding the DCT coefficients of a given block, the less the expected distortion, and vice versa. Based on this relationship, a refined MSE estimate uses a linear combination of the previous estimation (Eq. 3) and a signal that is the inverse of the number of bits that have been used in coding the DCT coefficients. The number of bits used in coding DCT coefficients is easily determined when parsing the bitstream. However, this number varies significantly from one block to another, and even from one macroblock to another. Accordingly, based on a regression analysis of empirical data, the refined MSE estimate uses a weighted sum of the MSE estimate given by Eq. (3), the inverse of the number of coded DCT bits per frame filtered by length-3 median filter, and the inverse of the number of coded DCT bits per frame filtered by a length-4 median filter. The number of bits used to code the DCT coefficients of each frame are summed and the sums of the number of coded bits per frame are filtered using length-3 and length-4 median filters. The median filters take the median sum of the last 3 frames (length-3) and the last 4 frames (length-4), including the current frame, to smooth variations in the number of bits being used to code DCT coefficients. The median sums are then weighted and added to a weighted value of the MSE estimate.

The refined MSE estimate is calculated by the CDQM 220 for each macroblock, and is provided to the GUI 200 for display by the bitstream quality analyzer 190. The GUI 200 displays the refined MSE estimate on both a frame-by-frame basis, and at the macroblock level for the current frame. Prior to display at the macroblock level, the refined MSE estimate for each macroblock is smoothed by spatially averaging the refined MSE estimate for a given macroblock across its neighboring macroblocks, to better reflect the distortion that would appear to the user.

The second estimate of the predicted amount of distortion of the resulting video output bitstream is based on the refined MSE estimate, and incorporates a simple model of human visual perception. This metric accounts for pattern sensitivity (i.e., the sensitivity of the human eye as a function of spatial and temporal frequency) and multiplies the error spectrum by a contrast sensitivity function (CSF) of the human eye and computes its energy. The CSF measures the sensitivity of the visual system to stimuli as a function of their frequency. The estimated amount of distortion based on quantization error, $e(f_x, f_y, f_t)$ can be determined for each macroblock of each frame based on the refined MSE estimate, where $f_x, f_y$ are spatial frequency coordinates, and $f_t$ is the temporal frequency. A sensitivity based distortion measure $e_s$ is given by Eq. (4):

$$e_s = \int_{f_x}\int_{f_y}\int_{f_t} S(f_x,f_y,f_t)|e(f_x,f_y,f_t)|^2 \qquad (4)$$

where $S(f_x, f_y, f_t)$ represents the CSF of the human eye, and $e(f_x, f_y, f_t)^2$ is similar to the refined MSE, but in the frequency domain. Because Eq. (4) is defined in the frequency domain, and the refined MSE is calculated in the pixel domain, the CDQM 220 instead implements Eq. (4) as a convolution in the pixel domain with a finite impulse response digital filter which approximates the CSF. The actual CSF that is used to determine this second estimate of distortion is based on the spatio-temporal surface described in "Spatiotemporal Characteristics of Visual Mechanisms: Excitatory-Inhibitory Model", by Christina A. Burbek and D. H. Kelly, *Journal of the Optical Society of America*, Vol. 70, No. 9, pp. 1121–1126, September 1980. The impulse response of the digital filter is then obtained by windowing using Kaiser windows of length 16, according to well known signal processing techniques. Of course, it should be realized that other contrast sensitivity functions and different signal processing techniques may be used. Similar to the refined MSE estimate, this objective metric (i.e., the second estimate) is calculated by the CDQM 220 for each macroblock and is provided to the GUI 200 for display by the bitstream quality analyzer 190. The objective metric, if selected by the user, is displayed on a frame-by-frame basis, and at the macroblock level for the current frame.

The third estimate of the predicted amount of distortion of the resulting video output bitstream is also based on the refined MSE estimate and predicts the amount of distortion of the resulting video output bitstream due to motion prediction error (also termed "Displaced Frame Difference" (DFD)). The DFD is transmitted in a quantized form to the decoder for the non-intra blocks and represents the error of the motion prediction performed by the encoder (i.e., what could not be predicted). Accordingly, if $DFD[n_1, n_2]$ represents the motion prediction error signal in the pixel domain prior to quantization ($n_1, n_2$ represent pixel coordinate axes, e.g. x, y), and $DFD_c[n_1, n_2]$ represents the same signal (also in the pixel domain) after quantization (and IQDCT and IDCT), information describing $DFD_c[n_1, n_2]$ is contained in the bitstream in the form of DCT coefficients in the non-intra blocks. The difference between $DFD[n_1, n_2]$ and $DFD_c[n_1, n_2]$ is equal to the quantization error $e[n_1, n_2]$, which can be obtained from the refined MSE estimation. Accordingly, the distortion due to motion prediction error can be estimated (in the pixel domain) using Eq. (5).

$$DFD[n_1,n_2]=DFD_c[n_1,n_2]+e[n_1,n_2] \qquad (5)$$

Because the DCT is a unitary transform, computation of the energy of $DFD[n_1, n_2]$, (i.e., the amount of motion prediction error) can be easily carried out in the frequency domain by directly using the samples of the DCT coefficients of the non-intra blocks. Thus, an estimate of the amount of motion prediction error can be determined, macroblock-by-macroblock, based on the refined MSE estimate and DCT coefficients of the non-intra blocks, without having to compute the IDCT. This knowledge of the motion prediction error gives useful insight on the performance of motion estimation by the encoder. Similar to the refined MSE estimate and the second estimate (objective metric), the DFD is calculated by the CDQM 220 for each macroblock and is provided to the GUI 200 for display by the bitstream quality analyzer 190. The DFD estimate, if selected by the user, is displayed on a frame-by-frame basis, and at the macroblock level for the current frame.

Although the previously described estimations of distortion were based on the approximations of Eq. (3), there are other methods of estimating the amount of spatial distortion of the resulting video output stream due to quantization error. Based on previous work by Gregory S. Yovanoff and Sam Liu (described in "Statistical Analysis of the DCT Coefficients and their Quantization Error", *Proceedings of the 30th Asilomar Conference on Signals, Systems, and Computers*, 1996) on the distribution of JPEG DCT coefficient distribution, it can be assumed that MPEG DCT coefficient distribution can also be estimated based on a statistical modeling of the DCT coefficient distribution and the distribution of the quantization error. For example, assuming that we have an estimate of the DCT coefficient distribution by knowing the probability density function (pdf), $f_i(x)$, of each coefficient, where i is the index of the DCT coefficient, Yovanoff and Liu have shown that this pdf can be approximated by a generalized gaussian function (GGF). Denoting $Q_i$ as the quantized value for the considered DCT coefficient x, of index i, (i.e., after quantization at encoder and inverse quantization at decoder) the quantization error can be expressed as (since $Q_i$ is known from the bitstream):

$$e = \int_{Q_i-\frac{\Delta_i}{2}}^{Q_i+\frac{\Delta_i}{2}} (x - Q_i)^2 f_i(x|Q_i)dx \qquad (6)$$

where $\Delta_i$ is the quantization step for the considered coefficient (which is known from the bitstream) and x is the actual value of the original DCT coefficient corresponding to $Q_i$, before quantization. The conditional probability density function $f_i(x|Q_i)$ in Eq. (6) is related to the previous pdf by Eq. (7):

$$f_i(x|Q_i) = \frac{f_i(x)}{\int_{Q_i-\frac{\Delta_i}{2}}^{Q_i+\frac{\Delta_i}{2}} f_i(x) dx} \qquad (7)$$

where $f_t(x)$ is the distribution of DCT coefficients before quantization. The quantization error can thus be estimated, given an estimation of the pdf $f_t(x)$. A fixed estimate of the pdf $f_t(x)$ that is based on measurements of some original video sequences can be used, or alternatively, the pdf $f_t(x)$ can be estimated during the decoding process. The second method may potentially provide a better estimation of the pdf for the considered sequence and may be determined during the decoding process by measuring the histogram of the quantized DCT coefficients and estimating the parameters of the GGF by maximum likelihood estimation.

FIG. 8 illustrates the functional relationship of the CDQM 220 and the decoder 210 within the bitstream quality analyzer 190, and the varying levels of decoding that are required to predict the different estimates of distortion of the resulting video output. As can be seen, the calculation of the refined MSE and the Objective metric only require IVLC decoding (unless user defined quantization matrices are present), while the DFD error estimation further requires IQDCT decoding. Given a typical MPEG video bitstream, none of the aforementioned predictions of distortion error requires IDCT calculations. In addition, none of the predictions of distortion requires the original input video bitstream prior to encoding.

It should be apparent to one of ordinary skill in the art that the methods used by the CDQM 220 to predict distortion and described above are valid for any block DCT compression scheme, including motion compensated block DCT compression schemes like MPEG-1 and MPEG-2, and H.261, H.263, etc. Furthermore, it should also be apparent that a bitstream quality analyzer capable of monitoring and analyzing these other types of video streams can be implemented.

Figure 9:
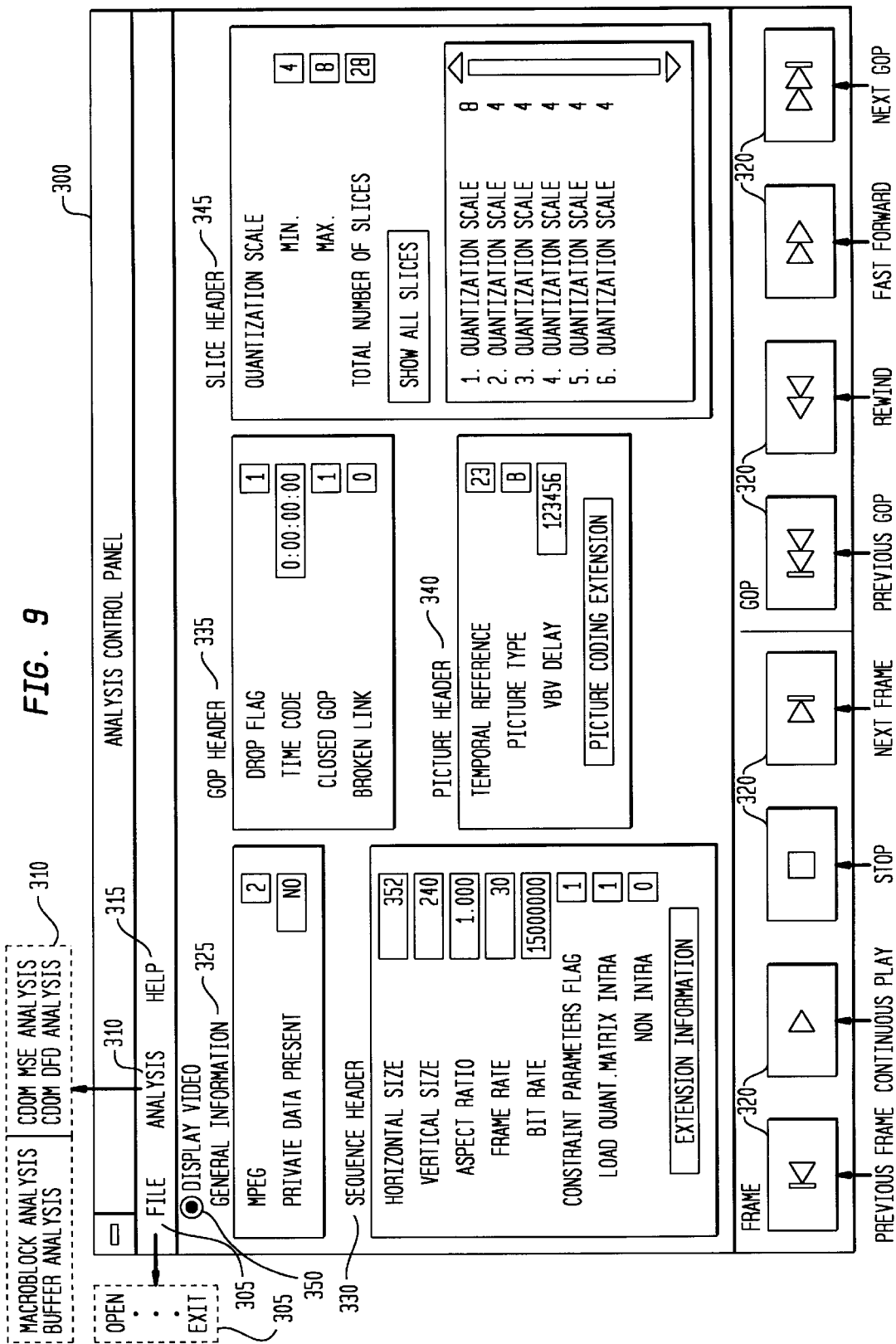
FIG. 9 illustrates a top level view, as seen by a user, of a graphical user interface of a video bitstream analysis system according to an embodiment of the present invention.

FIG. 9 illustrates a display screen, as seen by a user, of a bitstream analysis system similar to the one depicted in FIG. 6 when the bitstream quality analyzer 190 is executing. At the top level, the GUI 200 presents the user with an Analysis Control Panel window 300 in which various information is monitored and displayed, various control functions may be selected, and in which varying degrees of monitoring and analysis may be selected. The Analysis Control Panel window 300 includes a number of pull-down menus including a File menu 305, an Analysis menu 310 and a Help menu 315. The File menu 305 includes options allowing the user to Open a particular file, for example, a file containing a video bitstream that has been written to memory 120, or to Exit the bitstream quality analyzer 190. Other options within the File menu 305 (not shown) may, of course, include deleting a file, renaming a file, etc. The Analysis menu 310 includes varying levels of analysis that may be selected by the user, including Macroblock Analysis, Buffer Analysis, CDQM Mean Square Error Analysis, and CDQM Displayed Frame Difference Analysis. Options within the Help menu 315 are not shown, but would of course, include information describing the various options and the operation of the bitstream quality analyzer 190.

Within the Analysis Control Panel window 300, users can select what information is displayed at the frame level or the group of pictures level by accessing the control function buttons 320. By default, the top level of the Analysis Control Panel window 300 includes various fields describing the monitored video bitstream including a General Information field 325, a Sequence Header field 330, a GOP Header field 335, a Picture Header field 340, and a Slice Header field 345. The information displayed within the General Information field 325, the Sequence Header field 330, the GOP Header field 335, and the Picture Header field 340 is based on information parsed from the appropriate headers and needs no further explanation. As shown in FIG. 9, the Slice Header field 345 includes minimum and maximum quantization scale values for all the slices in the particular frame being monitored, as well as the total number of slices within the particular frame. Were the frame to include only one slice, then the minimum and maximum quantization scale values would be the same. Also depicted within the Slice Header field 345 are the quantization scale values, by slice, for each of the slices in the particular frame. Additional quantization scale values, beyond the six slices shown, can be viewed by scrolling downward. It should be emphasized that all the information displayed in the top level of the Analysis Control Panel window 300 and described thus far is obtained by parsing the compressed video bitstream and without any decoding. Accordingly, this information requires negligible time to display.

The Analysis Control Panel window 300 also provides the user with the ability to display the motion picture represented by the video bitstream by selecting Display Video 350. However, it will of course be realized that the display of the video requires full decoding of the compressed video bitstream. An example of such a selection is shown in FIG. 10, in which a viewing area 355 is presented to the user via a Video Title window 360. Although not shown, the motion picture is displayed in the viewing area 355 and is controlled by the control function buttons 320 (FIG. 9).

FIGS. 11 and 12 illustrate Sequence Extension and Picture Coding Extension drop down menu windows 365, 370 that are viewable from within the Analysis Control Panel window 300 by selecting Extension Information within the Sequence Header field 330, or Picture Coding Extension within the Picture Header field 340, respectively.

Figure 13:
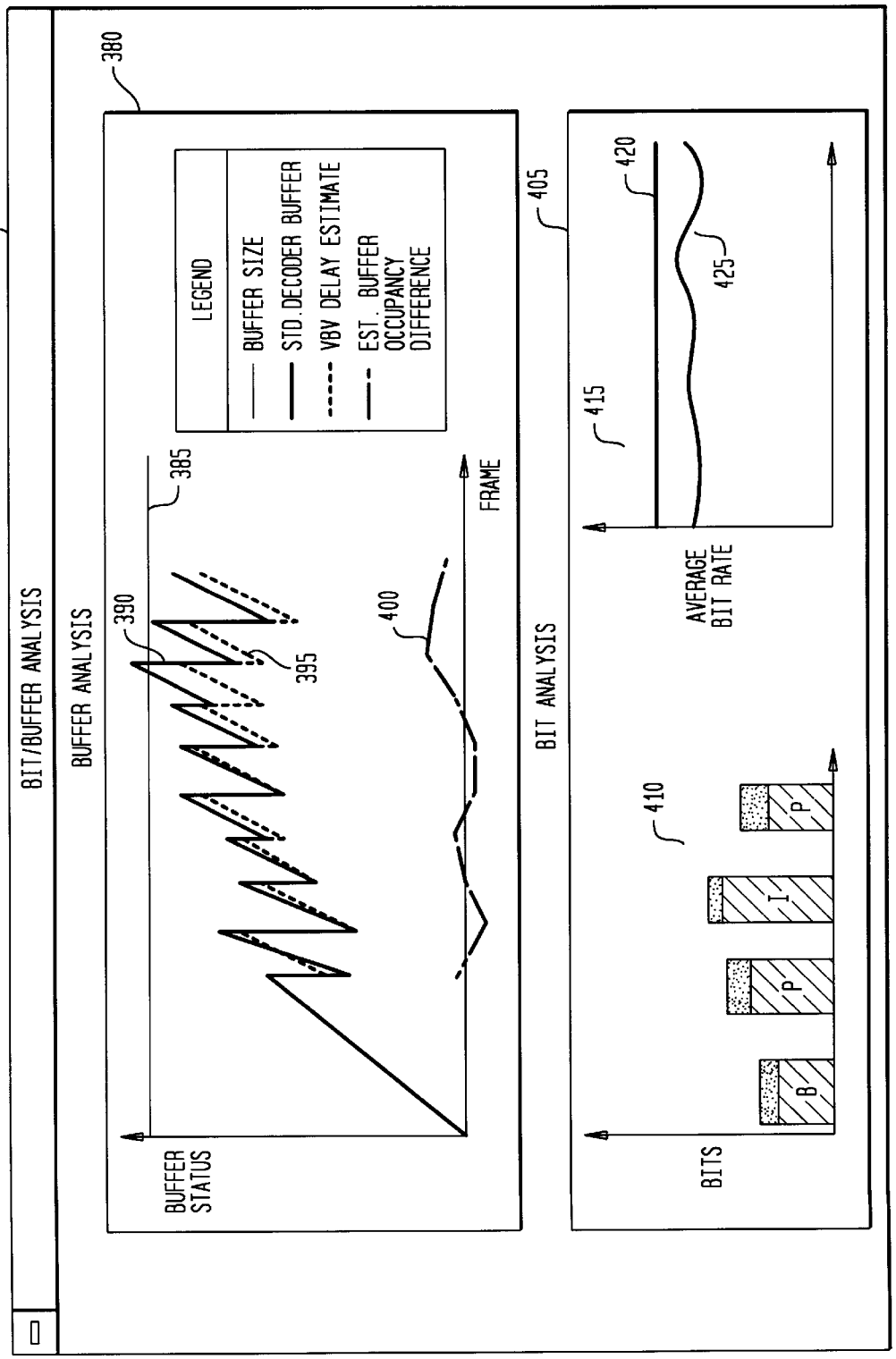

FIG. 13 illustrates a Bit/Buffer Analysis window 375 of the video bitstream when the user selects Buffer Analysis within the Analysis pull-down menu 310. As shown in the Buffer Analysis portion 380 of the Bit/Buffer Analysis window 375, the GUI 200 displays, on a frame-by-frame basis, curves representing Buffer Size 385 (based on vbv_buffer_size and vbv_buffer_size_extension), Std. Decoder Buffer Status 390 (based on the STD Decoder model), an estimate of the vbv delay (VBV Delay Estimate 395), and an Estimated Buffer Occupancy Difference 400, all relating to the state of the compressed video data buffer of the decoder 210. The Estimated Buffer Occupancy Difference 400 represents the difference between Std. Decoder Buffer Status 390 and VBV Delay Estimate 395. As can be seen from FIG. 13, the information that is displayed allows one to quickly view the fullness of the compressed video buffer using two different metrics, to identify risks of buffer under flow or overflow, to assess the efficiency of buffer utilization by the encoded video bitstream, and to assess the real-time decodability of the encoded video bitstream.

The Bit Analysis portion 405 of FIG. 13 displays two different metrics regarding bit usage. The lower left portion 410 of the Bit Analysis portion 405 displays the number of bits and the frame type of the most recent frames, with the darkened areas representing the number of stuffed bits in each of the most recent frames. The lower right portion 415 of the Bit Analysis portion 405 displays the target bit rate 420 (based on sequence header and sequence extension information) as compared to a smoothed average value of the actual bit rate 425.

Figure 14:
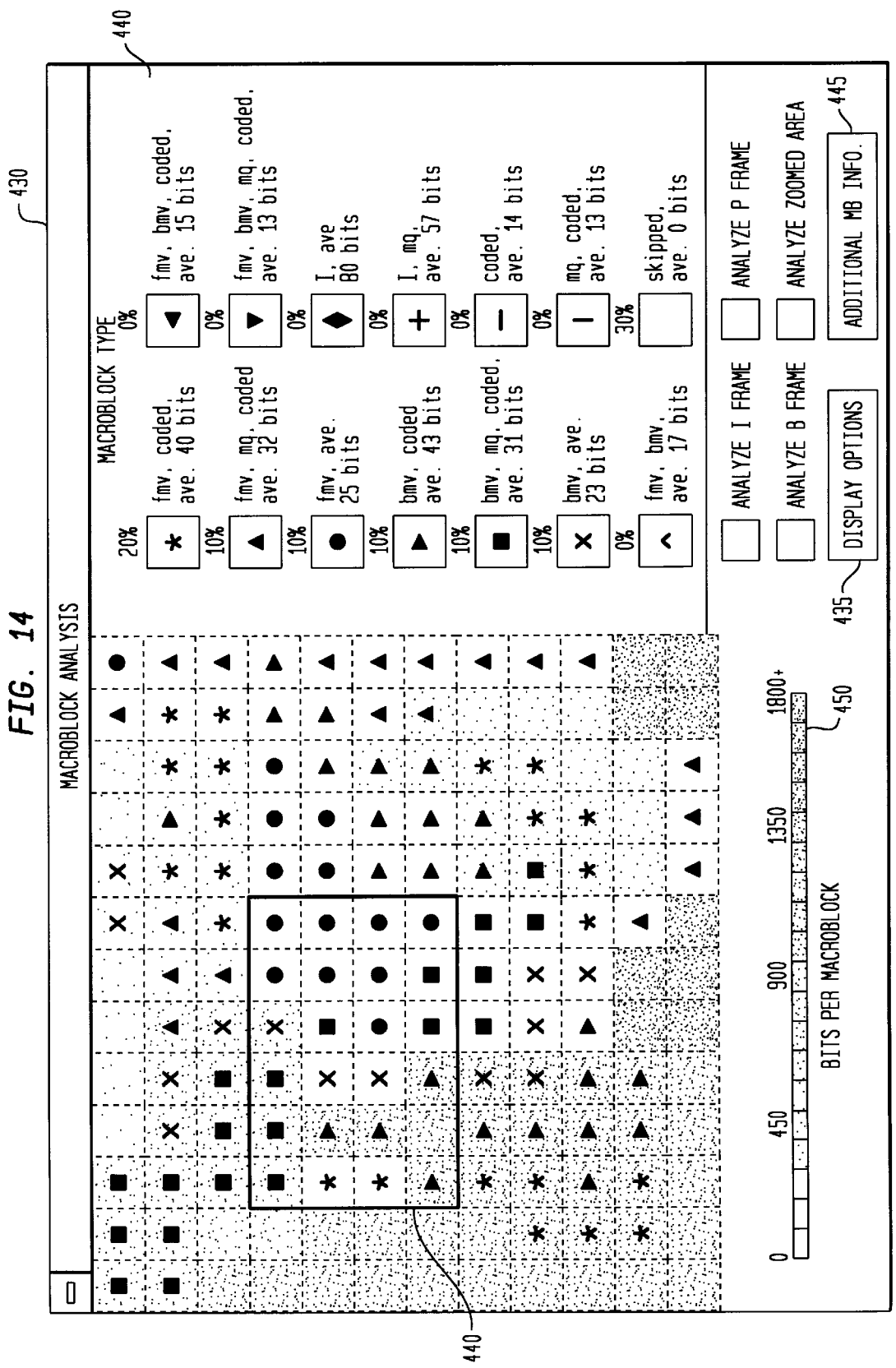

FIG. 14 illustrates a Macroblock Analysis window 430 for the video bitstream when the user selects Macroblock Analysis within the Analysis pull-down menu 310. A wealth of information is available to the user depending on the Display Options 435 selected by the user. Region 440 of the Macroblock Analysis window 430 shows various types of macroblocks and the percentage of macroblocks of that type within the current frame. Viewing area 440 corresponds to the viewing area 355 in FIG. 10 in which the video is displayed.

Figure 15:
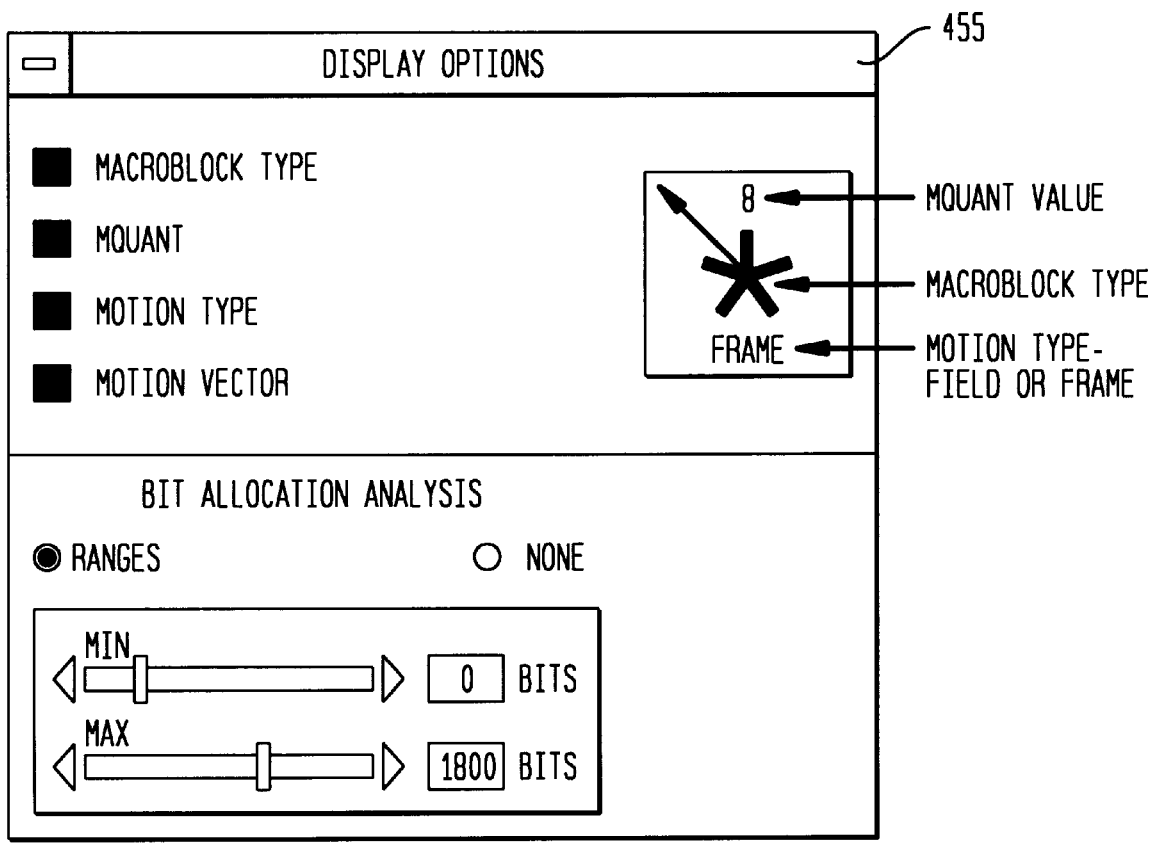

FIG. 15 illustrates a Display Options pop-up window 455 that is displayed to the user when the Display Options button 435 is selected in the Macroblock Analysis window 430 shown in FIG. 14. The various display options that may be selected by the user include displaying Macroblock Type, macroblock quantization value MQUANT, macroblock Motion Type, and macroblock Motion Vector(s). Similarly, the user may select the granularity of bit allocation analysis, which, as depicted in the Bits per Macroblock legend 450 of the Macroblock Analysis window 430 in FIG. 14, controls granularity of the shading in the Macroblock Analysis window 430. The actual information displayed in FIG. 14 corresponds to a selection of Macroblock Type only. Depending upon the display options selected by the user, the level of decoding that is performed by the bitstream quality analyzer 190 and displayed by the GUI 200 will vary from none to decoding through the IVLC level.

FIG. 16 shows an Additional Macroblock Information pop up window 460 that is displayed to the user when the Additional MB Info button 445 is selected in the Macroblock Analysis window 430 shown in FIG. 14. The information contained in this window is self explanatory and requires IVLC decoding and IQDCT decoding.

Figure 17:
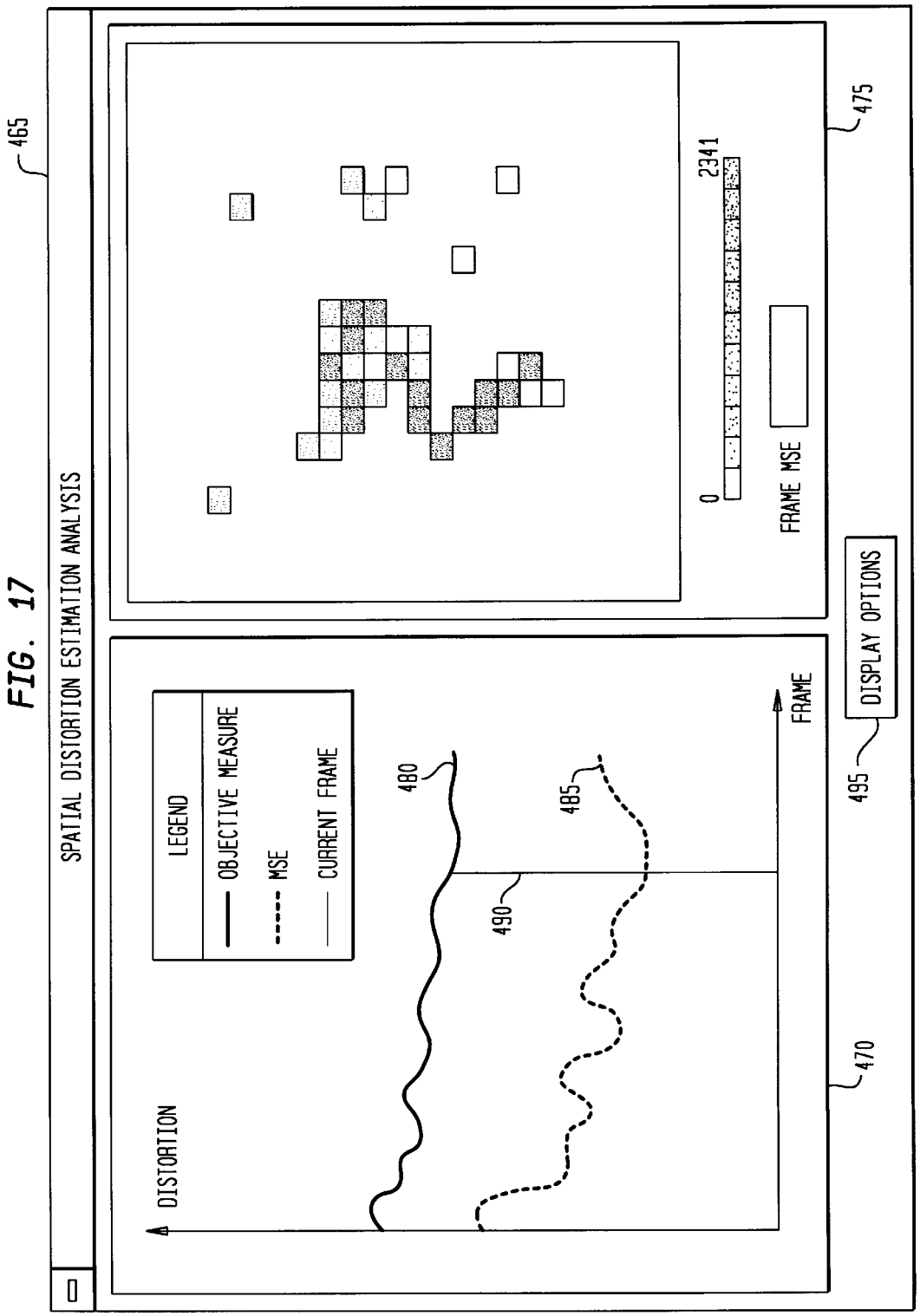

FIG. 17 shows a Spatial Distortion Estimation Analysis window 465 when the user selects CDQM MSE Analysis within the Analysis pull-down menu 310. As illustrated, the left hand portion 470 displays the refined MSE 480 estimation of spatial distortion and the Objective Measure 485 estimation of spatial distortion, on a frame-by-frame basis, for the luminance components, with a Current Frame marker 490 depicting the current frame. The right hand portion 475 illustrates spatial distortion of the current frame (as indicated by the Current Frame marker 490) at a macroblock level of detail using the refined MSE measure of spatial distortion, although the Objective Measure could have been selected instead via the Display Options button 495. As mentioned previously, prior to display at the macroblock level, the refined MSE estimate for each macroblock is smoothed by spatially averaging the refined MSE estimate for a given macroblock across its neighboring macroblocks, to better reflect the distortion that would appear to the user.

Figure 18:
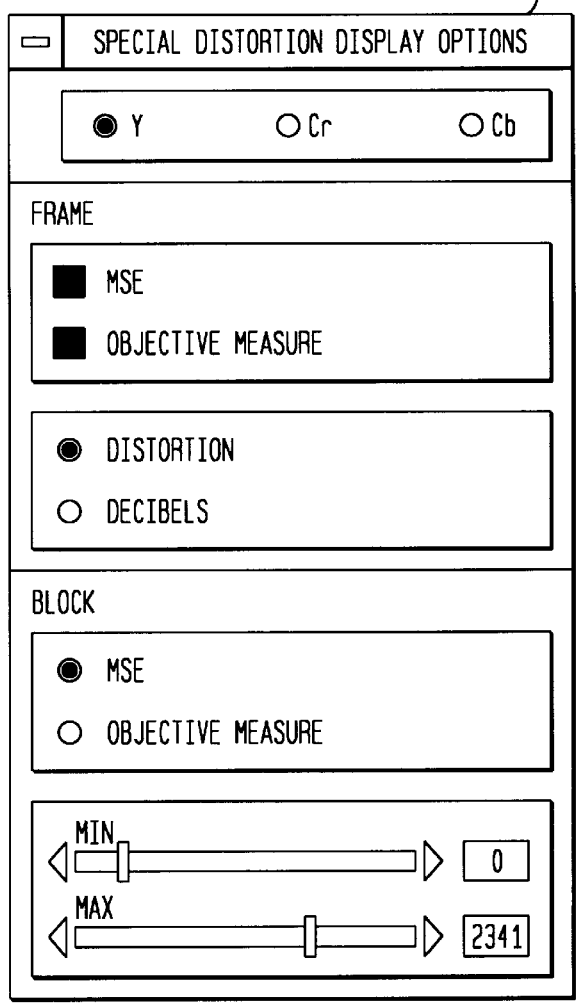

FIG. 18 illustrates a Spatial Distortion Display Options window 500 when the Display Options button 495 is selected in the Spatial Distortion Estimation Analysis window 465. The Spatial Distortion Display Options window 500 allows the user customize the various spatial distortion metrics to their particular requirements.

Figure 20:
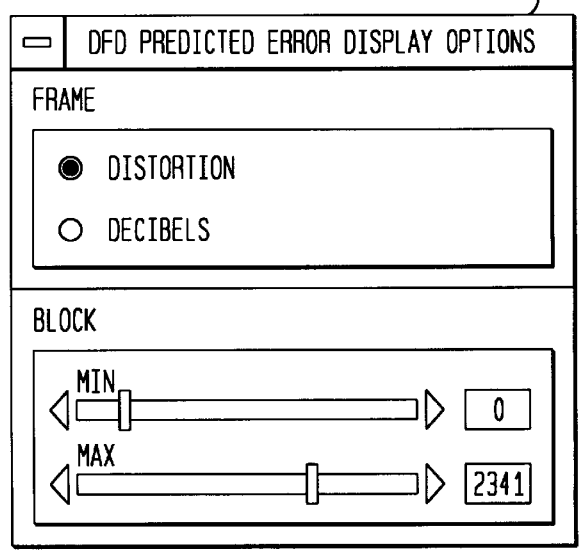
Figure 19:
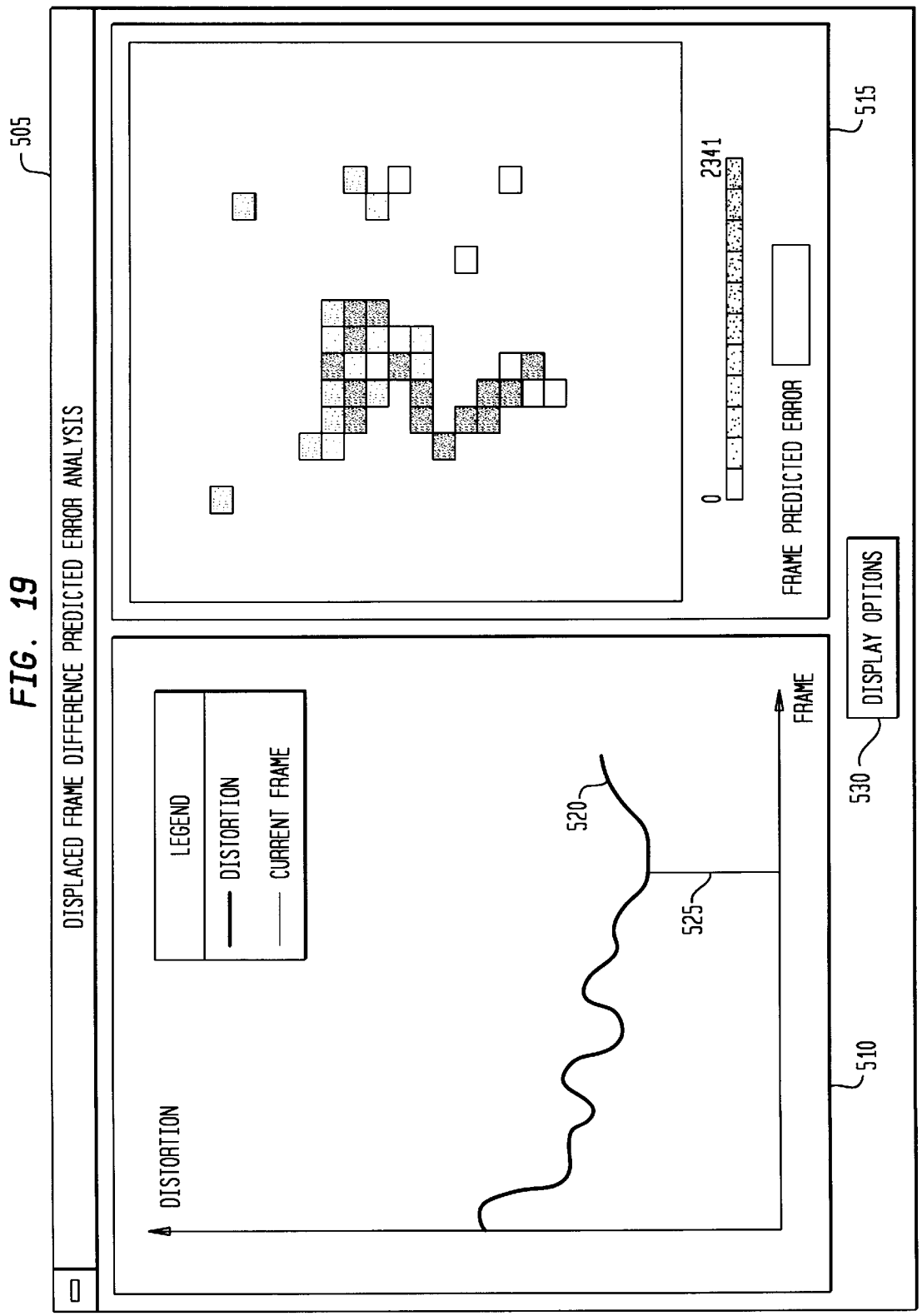

FIG. 19 illustrates a Displaced Frame Difference Predicted Error Analysis window 505 when the user selects CDQM DFD Analysis within the Analysis pull-down menu 310. As illustrated, the left hand portion 510 displays the displaced frame difference estimation of motion prediction Distortion 520 on a frame-by-frame basis, with a Current Frame marker 525 depicting the current frame. The right hand portion 515 illustrates the estimated motion prediction Distortion of the current frame (as indicated by the Current Frame marker 525) at a macroblock level of detail. The various display options that are selectable by the user are illustrated in FIG. 20 in a DFD Predicted Error Display Options window 535 by selecting the Display Option button 530 in the Displaced Frame Difference Predicted Error Analysis window 505 of FIG. 19.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A bitstream quality analysis system comprising:

an MPEG video decoder to receive a video elementary bitstream and selectively decode the video elementary bitstream in layers, to a layer of decoding that corresponds to a level of analysis which is selected by a user and which is performed on the video elementary bitstream, the video decoder extracting decoded parameters characterizing the video elementary bitstream;

a compressed domain quality meter, operatively coupled to the video decoder, to receive the decoded parameters corresponding to the layer of decoding performed by the video decoder and calculate at least one metric of an amount of distortion in a fully decoded video scene that is contained in the video elementary bitstream based on the decoded parameters and without full decoding by the video decoder; and a graphical user interface, operatively coupled to the video decoder and the compressed domain quality meter, to receive the decoded parameters from the video decoder and the at least one metric from the compressed domain quality meter, the graphical user interface displaying the decoded parameters and the at least one metric.

2. The bitstream quality analysis system of claim 1, wherein the layers of decoding performed by the video decoder include a first layer for performing variable length decoding of the video elementary bitstream, a second layer for performing inverse quantization of quantized DCT coefficients, and a third layer for performing an inverse discrete cosine transformation of DCT coefficients, and wherein the at least one metric calculated by the compressed domain quality meter includes a first metric indicative of the amount of distortion in the fully decoded video scene due to quantization error in calculating the quantized DCT coefficients, the first metric requiring only the first layer of decoding.

3. The bitstream quality analysis system of claim 2, wherein the at least one metric calculated by the compressed domain quality meter further includes a second metric indicative of the amount of distortion in the fully decoded video scene that is capable of human visual perception and is due to the quantization error in calculating the quantized DCT coefficients, the second metric requiring only the first layer of decoding.

4. The bitstream quality analysis system of claim 3, wherein the at least one metric calculated by the compressed domain quality meter further includes a third metric indicative of the amount of distortion in the fully decoded video scene due to motion prediction error, the third metric requiring only the first and second layers of decoding.

5. The bitstream quality analysis system of claim 1, wherein the layers of decoding performed by the video decoder include a first layer for performing variable length decoding of the video elementary bitstream, a second layer for performing inverse quantization of quantized DCT coefficients, and a third layer for performing an inverse discrete cosine transformation of DCT coefficients, and wherein the at least one metric calculated by the compressed domain quality meter includes a first metric indicative of the amount of distortion in the fully decoded video scene that is capable of human visual perception and is due to quantization error in calculating the quantized DCT coefficients, the first metric requiring only the first layer of decoding.

6. The bitstream quality analysis system of claim 1, wherein the layers of decoding performed by the video decoder include a first layer for performing variable length decoding of the video elementary bitstream, a second layer for performing inverse quantization of quantized DCT coefficients, and a third layer for performing an inverse discrete cosine transformation of DCT coefficients, and wherein the at least one metric calculated by the compressed domain quality meter includes a first metric indicative of the amount of distortion in the fully decoded video scene due to motion prediction error, the first metric requiring only the first and second layers of decoding.

7. The bitstream quality analysis system of claim 1, further including:

a demultiplexer, operatively coupled to the video decoder, to receive a bitstream and to separate from the bitstream at least one elementary bitstream, wherein the at least one elementary bitstream includes a video elementary bitstream, the demultiplexer providing the video elementary bitstream to the video decoder for analysis.

8. A method of monitoring a bitstream comprising the steps of:

separating from the bitstream at least one elementary bitstream, the at least one elementary bitstream including a video elementary bitstream;

parsing and selectively decoding the video elementary bitstream in layers, to a layer of decoding that corresponds to a user selected level of analysis, to extract decoded parameters characterizing the video elementary bitstream;

calculating at least one metric of an amount of distortion in the fully decoded video scene that is contained in the video elementary bitstream based on the decoded parameters and without full decoding; and displaying the decoded parameters and the at least one metric of the amount of distortion on a display.

9. The method of claim 8, further comprising the steps of:

comparing values of the decoded parameters to parameter values allowed by an MPEG standard;

determining whether the video elementary bitstream conforms to the MPEG standard based on the step of comparing; and displaying a message on the display when it is determined that the video elementary bitstream does not conform to the MPEG standard.

10. The method of claim 8, further comprising the steps of:

variable length decoding the video elementary bitstream to provide decoded data that is variable length encoded in the video elementary bitstream;

predicting an amount of distortion in the elementary video bitstream after full decoding of the elementary video bitstream based on the decoded data; and displaying the predicted amount of distortion in the elementary video bitstream on the display.

11. The method of claim 8, further comprising the steps of:

variable length decoding the video elementary bitstream to provide decoded data that is variable length decoded in the video elementary bitstream;

calculating at least one metric indicative of an amount of compressed data in a decoder buffer based on the decoded data; and displaying the at least one metric indicative of the amount of compressed data on the display.

12. The method of claim 11, wherein the step of calculating the at least one metric indicative of the amount of compressed data includes steps of:

determining a frame type of each frame contained in the elementary video bitstream based on the decoded data;

counting an amount of compressed data in each type of frame contained in the elementary video bitstream based on the decoded data; and calculating a first metric indicative of the amount of compressed data in the decoder buffer based on a standard decoder buffer model, the amount of compressed data in each type of frame, and the frame type of each frame.

13. The method of claim 12, wherein the step of calculating the at least one metric indicative of the amount of compressed data further includes a step of:

calculating a second metric indicative of the amount of compressed data in the decoder buffer based on an amount of time each frame is to stay in the compressed data decoder buffer and the amount of compressed data in each type of frame.

14. The method of claim 12, further comprising the steps of:

counting an amount of stuffed data in each type of frame based on the decoded data; and displaying the amount of stuffed data and the amount of compressed data in each type of frame on the display.

15. The method of claim 8, further comprising the steps of:

variable length decoding the video elementary bitstream to provide decoded data that is variable length encoded in the video elementary bitstream;

determining a quantization scale of a macroblock contained in the elementary video bitstream based on one of the decoded parameters and the decoded data;

calculating a first distortion metric indicative of an amount of distortion in the elementary video bitstream due to quantization error based upon the quantization scale of the macroblock and quantization values of DCT coefficients within the macroblock; and displaying the first distortion metric on the display.

16. The method of claim 15, further comprising the steps of:

multiplying the first distortion metric by a contrast sensitivity function of human visual perception to calculate a second distortion metric that is indicative of the amount of distortion in the elementary video bitstream due to the quantization error and is capable of human visual perception; and displaying the second distortion metric on the display.

17. The method of claim 8, further comprising the steps of:
- variable length decoding the video elementary bitstream to provide decoded data that is variable length encoded in the video elementary bitstream;
- determining a quantization scale of a macroblock contained in the elementary video bitstream based on one of the decoded parameters and the decoded data;
- calculating an amount of distortion in the elementary video bitstream due to quantization error based upon the quantization scale of the macroblock and quantization values of DCT coefficients within the macroblock;
- multiplying the amount of distortion by a contrast sensitivity function of human visual perception to calculate a distortion metric indicative of the amount of distortion in the elementary video bitstream due to the quantization error and capable of human visual perception; and
- displaying the distortion metric.

18. The method of claim 8, further comprising the steps of:
- variable length decoding the video elementary bitstream to provide decoded data that is variable length encoded in the video elementary bitstream;
- determining a quantization scale of a predicted macroblock contained in the elementary video bitstream based on one of the decoded parameters and the decoded data;
- calculating an amount of distortion in the elementary video bitstream due to quantization error based upon the quantization scale of the predicted macroblock and quantization values of DCT coefficients within the predicted macroblock;
- inversely quantizing DCT coefficients within the predicted macroblock to provide dequantized DCT coefficients;
- calculating an amount of distortion in the elementary video bitstream due to motion prediction error based on the amount of distortion and the dequantized DCT coefficients; and
- displaying the amount of distortion in the elementary video bitstream due to motion prediction error on the display.

19. The method of claim 8, further comprising the step of:
- separating from the bitstream at least one elementary bitstream for parsing and decoding, wherein the at least one elementary bitstream includes a video elementary bitstream.

* * * * *